Oct. 14, 1958 H. T. MERYMAN 2,856,534
ELECTRON MICROSCOPE FOCUSING SYSTEM
Filed May 16, 1956 2 Sheets-Sheet 1

INVENTOR
HAROLD T. MERYMAN

BY J. Gibson Semmes

ATTORNEY

Oct. 14, 1958

H. T. MERYMAN 2,856,534

ELECTRON MICROSCOPE FOCUSING SYSTEM

Filed May 16, 1956

Inventor

HAROLD T. MERYMAN

By J. Gibson Semmes

Attorney

United States Patent Office 2,856,534
Patented Oct. 14, 1958

2,856,534

ELECTRON MICROSCOPE FOCUSING SYSTEM

Harold T. Meryman, Shelton, Conn., assignor to Canal Industrial Corporation, Bethesda, Md., a corporation of Maryland Application May 16, 1956, Serial No. 585,211

4 Claims. (Cl. 250—49.5)

The present invention relates to electron microscope focus. Specifically the invention is directed to electromagnetic means for correcting abberations which are caused in the electron microscope by electromagnetic magnification and electron beam deflection focusing. The present invention is related to Patent No. 2,626,358.

In electromagnetic deflection focusing of the electron microscope it is quite essential to pass the beam through the same locus of the specimen as it naturally passes before and following deflection. Factors preventing this relocation include: the phenomena that cause the electron beam to follow and hold to a helical path within the electromagnetic lens; and lack of phase coincidence between upper and lower electromagnetic fields of an alternating current beam deflection focusing device. The present concept may be broadly defined as supplemental electromagnetic fields in the beam deflection focusing device which are controllably designed electrically to counteract undesirable deflection. In complement there is provided means for controlling "phase lag" between electromagnetic fields in an electron microscope beam deflection focusing device.

As objectives of invention, means are provided to obtain electrical balancing and alignment of the electron beam between upper and lower electromagnetic fields.

Further objectives include means for focusing the electron microscope at "cross over" where the angular aperture of the beam is the greatest and depth of field the shortest, all without changing condenser lens input and without loss of illumination at crossover.

In beam deflection focusing of the electron microscope, whereby electron beam displacement is caused by magnification and deflection, it is an objective properly to correct the attitude of the beam with respect to the selected plane of the specimen through the use of an electrical system.

Another objective includes creating means for signaling electron microscope aberration caused by off-center disposition of lens and aperture elements, contamination of components, imperfectly compensated lens, stray external fields and the like.

Yet another object is to create in electron microscopy means for increasing focusing sensitivity to obtain maximum resolution within a shortest possible space of time.

Other objectives of invention will appear hereinafter by reference to the following description and drawings:

Figure 1:
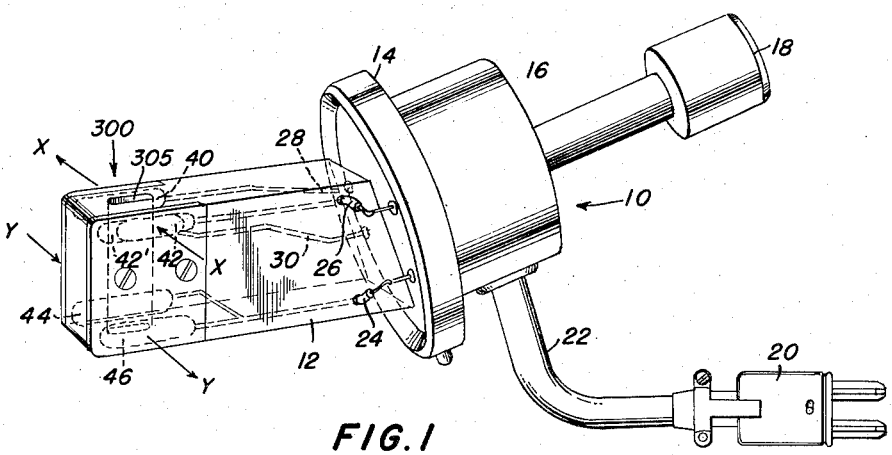
Fig. 1 is a view in perspective of the focusing head of the invention adapted to a specimen door of the electron microscope.

It is known that as the electron beam is passed through a magnifying lens, there is a tendency for the lens to influence or deflect the beam rotationally; thus as the beam leaves a magnifying lens the electron pattern is inclined to move in a helical path. In Patent No. 2,626,358 electromagnetic means are described as located between condenser and objective lenses to impart alternate deflection and return of the beam at a wide angle with respect to the specimen. In that concept, alternating current passing through two sets of coils repeatedly reverses the polarity of the forces exerted by the coils to alternately deflect or wobble the beam from side to side above the specimen resulting in the effect of reduced depth of field, thus giving a blurred image correctable by current adjustment in the objective lens. Balancing of the pairs of coils (fields) is effected by potentiometer control. In theory, the specimen is struck by the beam at the same spot (as if without the focusing device) sweeping out a wider angular aperture in a definite plane of the specimen.

Now it is proposed that a magnetic field be incorporated in the system to counteract deflection which may be caused by the electromagnetic forces of the condenser lens and the electromagnetic forces of the focusing device. Assuming that electromagnetic forces tend to deflect an electron beam 90° from direction of travel of the beam and the magnetic flux, a very complex deflection occurs as the beam enters the electromagnetic focusing device. This complexity is due, as stated, to the rotational influence of the condenser lens upon the beam and in part upon the electromagnetic force of the sets of coils in the focusing device. In effect the accelerated beam has a minor lateral vector influenced by electromagnetic "twisting" phenomena of the condenser lens, producing on passing through the beam deflection focusing device a minor lateral vector at 90°. This complexity results in illumination loss and misalignment or displacement of the beam with respect to the specimen. In focusing, therefore, elements of the beam will strike the specimen at loci which are foreign to the loci selected for normal operation studies. In some instances the elements of the deflected beam will strike the specimen on a different plane from that struck by an undeflected beam. This is overcome, in the present concept of invention, by introducing in the upper portion of the focusing device a set of coils, one of which is split and laterally displaced with respect to the other. The upper split coils are independently current controlled through a voltage divider.

Additionally, it may be said that the rotational vectors of the condenser lens and coils of the focusing device are normally insufficiently compensated for by the influence of the lower field in the focusing device described in Patent No. 2,626,358. For example, alternating current in upper and lower fields causes the top field to grow in strength, to fall and reverse while the lower opposes, the polarity of the electromagnetic forces reversing to provide an oscillation of the beam angularly with respect to the specimen. But note that as the upper field increases in strength to deflect the beam, the lower has insufficient strength to return the beam properly and vice versa. This "phase lag" between the two fields so to speak is corrected in the present invention by variable inductance or capacitance elements.

Figure 3:
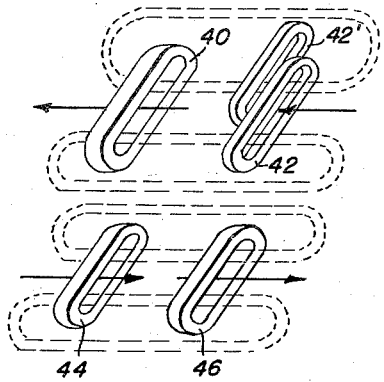
Fig. 3 is a schematic representation of the two sets of coils, and the electron beam influencing fields created by the coils to effect desired control in beam deflection focusing.

Referring now to Fig. 1, beam deflection focusing head 300 is mounted on a conventional specimen door 10. The door comprises a multiple coil mount 12, door 14, cover 16 and handle 18. A suitable four lead plug 20 is attached to conductor 22, leads 24, 26, 28 and 30 passing through cover 16 and coil mount 12 to respective coils. Coils 40, 42, 42', 44 and 46 are fixed in the head 300 adjacent vertical aperture 305, coils 40 and 42, 42' being opposed at the top, coils 44 and 46 being opposed at the bottom. The relative fixed position of the coils is indicated in Fig. 3. Their synergistic effect will be described hereinafter.

Figure 4:
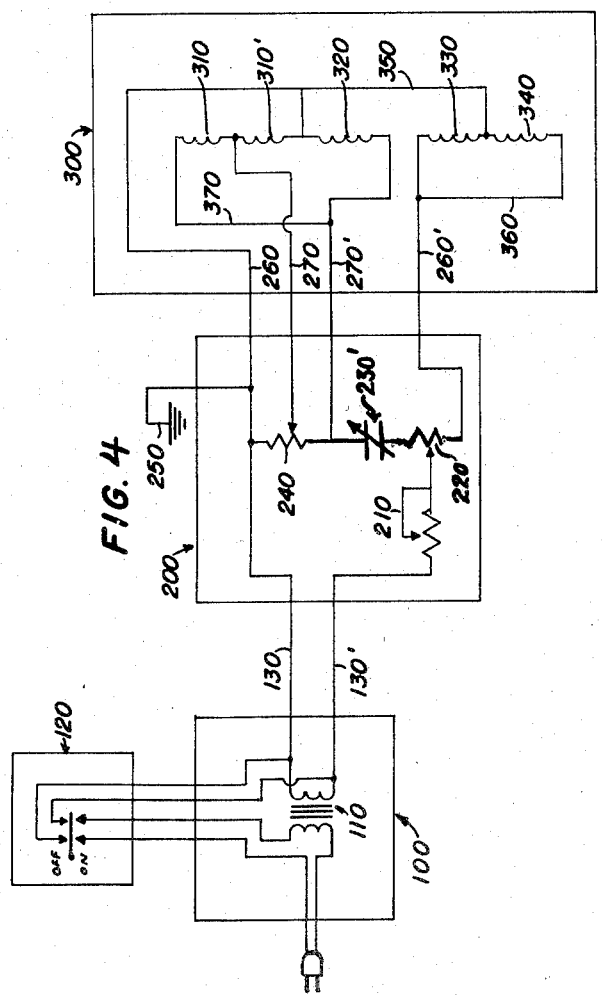
Figure 4 is a schematic drawing of the circuitry of the components used in obtaining electron beam control, the same being a modification of the circuitry shown in Fig. 2.

In operation 115 v. A. C. 60 cycle power source may be employed with a power supply transformer 100. See Figs. 2 and 4. Through footswitch 120 energization of the transformer is called for during beam deflection only. The particular switch is adapted to open the primary coil of the transformer and short the secondary while "off," to prevent residual current pickup in the secondary. Leads 130 and 130' from power supply element 100 conduct sine wave current to control box 200. As stated in Patent No. 2,626,358 square wave voltage may be substituted. A suitable ground 250 is provided for attachment to any suitable portion of the electron microscope chassis. Potentiometer 210 regulates the flow of current into the sets of coils of the focusing head 300. This is called "amplitude" control.

A second potentiometer 220 serves as a "balance" control of relative current flowing in upper coils 40, 42, 42'. By adjustment, this correlates strength of the electromagnetic fields created by the upper coils 40, 42, 42' on the one hand and lower coils 44, 46 on the other hand, thus in theory insuring return of the beam deflected by the influence of the upper electromagnetic field to that point or locus of the specimen which it would have struck had it not been deflected.

Balance having been provided for, attention is directed to the necessity for "alignment" of the electromagnetic fields influencing the beam whereby it is returned from deflection at exactly 180° to the direction in which it was deflected. To obtain alignment control voltage divider 240 is introduced into that portion of the circuit which influences the upper electromagnetic field. Specifically, voltage divider 240 is adapted to vary the relative current passing through split coils 310, 310'. Obviously when the element 240 is turned to top extreme coil 310' is completely shunted out, all current flowing through coil 310 and vice versa, intermediate positioning of the voltage divider giving selective current gradation control to the respective elements 310, 310' comprising the split coil. Attention is directed to Fig. 3 in which it is shown that the magnetic flux of the upper field is controllably retained by energization of coil 42. The invention, thus involves more than physical displacement of complementary coils, for by use of the voltage dividing potentiometer 240 accurate field alignment can be obtained selectively without physically moving the relative positioning of the coils in the system.

Figure 2:
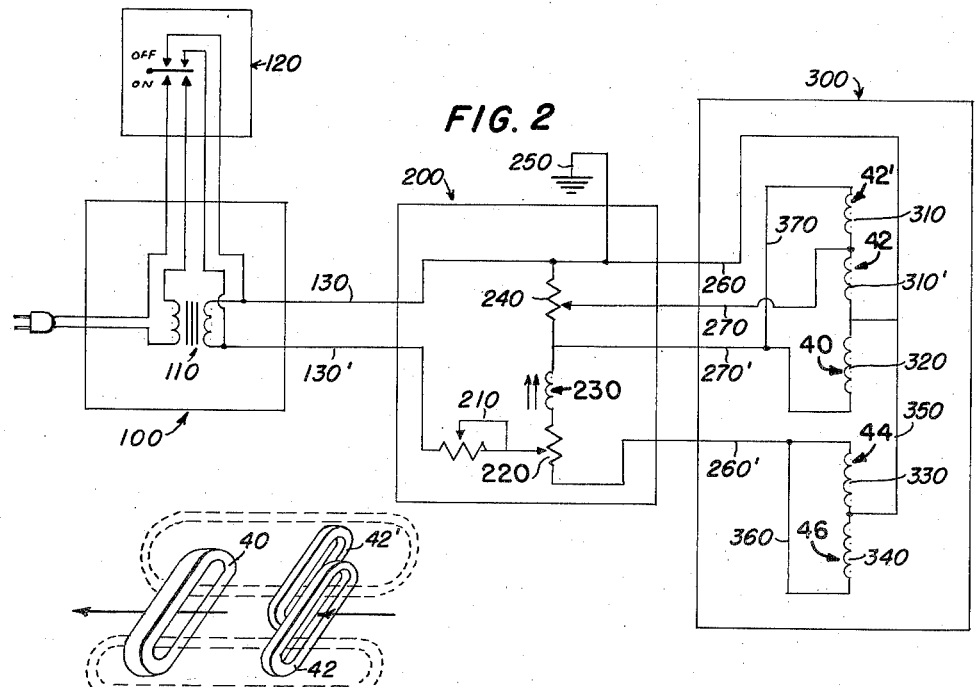
Fig. 2 is a schematic drawing of the circuitry of the components used in obtaining electron beam control.

Imperfect return of the deflected beam to specimen or aberration caused by "phase lag" between upper and lower electromagnetic fields is corrected and controlled by a variable inductance identified in the control box 200 as element 230 in Fig. 2. Element 230 is in effect a choke adjustable to shift the phase of field of the lower coil circuit with respect to the upper, thereby permitting attainment of exact coincidence or fusion of the electron beam at the specimen plane, which is normally struck by an undeflected beam. Inductance, as shown, or capacitance 230' may be employed in the circuit for this purpose, however the former is preferred due to its good current carrying capacity at 60 cycles and modification by iron core introduction where desired. See Fig. 4 for this modification in which capacitance is shown. The foregoing prevents phase lag and thereby prevents loss of illumination at electron beam cross-over.

Balance, alignment and phase lag control each as defined above combine to insure that the deflected electron beam will return to the precise locus of the specimen that it struck undeflected, irrespective of the imposition of 60 cycle modulation on the coils of the deflection focusing device.

It will be apparent to those skilled in the art that various arrangements of elements may be substituted without departing from the spirit of invention. For instance, the location of the split coil at the upper portion or lower portion of the focusing head is a matter of choice.

I claim:

1. In electron microscopy an electron beam deflection focusing system comprising: upper and lower electron beam influencing fields, said upper beam influencing field being produced by at least two field producing elements laterally displaced from each other and independently energized, alignment control means for the selective distribution of electrical energy to the elements of the upper beam influencing fields and a common source of electrical energy for all said upper and lower electron beam influencing fields whereby accurate deflection and return of the electron beam may be effected.

2. In electron microscopy, an electron beam deflection focusing system comprising: upper and lower electron beam influencing fields, said upper beam influencing field being produced by at least two field-producing elements laterally displaced from each other and independently energized, control means for the distribution of electrical energy to the elements of at least one of said beam influencing fields and a common source of electrical energy for all said upper and lower electron beam influencing fields, whereby accurate deflection and return of the electron beam may be deflected and means for shifting the phase of one of said fields with respect to the other.

3. The system according to claim 2 in which said means for shifting phase comprises an inductance in one of said fields.

4. The system according to claim 2 in which said means for shifting phase comprises a capacitance in one of said fields.

References Cited in the file of this patent

UNITED STATES PATENTS 2,626,358     Meryman                Jan. 20, 1953